(12) United States Patent
Torkildsen et al.

(10) Patent No.: US 6,284,023 B1
(45) Date of Patent: Sep. 4, 2001

(54) SEPARATION OF ACID GAS FROM NATURAL GAS

(75) Inventors: Bernt H. Torkildsen, Bergen-Sandviken; Martin Sigmundstad, Hafrsfjord; Harald Linga, Nesttun; Finn P. Nilsen, Nattland; Per H. Hanssen, Hafrsfjord, all of (NO)

(73) Assignee: Den Norske Stats Oljeselskap A.S. (NO)

( * ) Notice: Subject to any disclaimer, the term of this patent is extended or adjusted under 35 U.S.C. 154(b) by 0 days.

(21) Appl. No.: 09/525,828

(22) Filed: Mar. 15, 2000

Related U.S. Application Data

(63) Continuation of application No. PCT/GB98/02775, filed on Sep. 14, 1998.

(30) Foreign Application Priority Data

Sep. 15, 1997 (GB) .................................................. 9719668
Jan. 9, 1998 (GB) .................................................. 9800483

(51) Int. Cl.[7] .............................. B01D 47/10; B01D 53/14
(52) U.S. Cl. ................................ 95/216; 95/235; 95/236; 96/323; 261/DIG. 54
(58) Field of Search ............................ 95/216, 235, 236; 96/234, 266, 271, 272, 323; 261/DIG. 54

(56) References Cited

U.S. PATENT DOCUMENTS

| | | | |
|---|---|---|---|
| 3,912,469 | * 10/1975 | Ewan et al. | 261/DIG. 54 |
| 3,970,740 | * 7/1976 | Reeder et al. | 261/DIG. 54 |
| 4,235,607 | 11/1980 | Kinder et al. . | |
| 4,239,510 | 12/1980 | Hays et al. . | |
| 4,279,628 | 7/1981 | Wymer et al. . | |
| 4,293,524 | * 10/1981 | Teller et al. | 261/DIG. 54 |
| 4,511,544 | * 4/1985 | Connell et al. | 261/DIG. 54 |
| 4,603,035 | * 7/1986 | Connell et al. | 261/DIG. 54 |
| 4,828,768 | * 5/1989 | Talmor | 261/DIG. 54 |

FOREIGN PATENT DOCUMENTS

| | | |
|---|---|---|
| 3805157C | 4/1989 | (DE) . |
| 90/13859 | 11/1990 | (DE) . |
| 0379319 | 9/1996 | (EP) . |

* cited by examiner

*Primary Examiner*—Duane S. Smith
(74) *Attorney, Agent, or Firm*—Patterson, Thuente, Skaar & Christenesen, P.

(57) ABSTRACT

A method for removing acid gas components from combustion gas and natural gas. The method includes bringing the gas mixture into contact with sea water and subjecting the gas mixture and sea water to turbulent mixing conditions. This causes the acid gas to be absorbed by the sea water. The sea water can be disposed of offshore without any detrimental effect on the environment.

16 Claims, 6 Drawing Sheets

SEPARATION OF ACID GAS FROM NATURAL GAS

CROSS-REFERENCE TO RELATED APPLICATION

This is a Continuation of Application No. PCT/GB98/02775 filed Sep. 14, 1998.

FIELD OF THE INVENTION

The present invention relates to the removal acid gases such as $CO_2$, $NO_x$, $H_2S$, oxides of sulphur etc. from natural gas.

BACKGROUND OF THE INVENTION

Conventional systems for the absorption of acid gases employ a liquid solvent; typical solvents include amines such as methyldiethanolamine (MDEA), monoethanolamine (MEA) or diethanolamine (DEA), and mixtures of solvents. These solvents absorb $CO_2$, $NO_x$, $H_2S$ and other acid gases. The solvent is contacted with the sour gas mixture (gas mixture including acid gases) in a column which may be a packed column, a plate column or a bubble-cap column, or a column with some other form of contact medium. In these systems, the gas and liquid streams flow countercurrently.

The prior art absorption systems suffer the disadvantage that in order to achieve a significant degree of gas/liquid contact, the columns have to be large and their operation is hampered by excessive foaming. In addition, the subsequent stripping section which removes the acid gas from solution must also be large, to handle the large volume of solvent used. Since the operation normally takes place under high pressure and the fluids involved are highly corrosive, the capital costs of the large columns and subsequent stripping section is high. Furthermore, operating costs and maintenance costs are high.

It is an object of the present invention to provide a system for removing acid gas from natural gas which does not suffer from the disadvantages of the prior art, preferably with a high degree of efficiency and more economically than in existing methods.

SUMMARY OF THE INVENTION

According to one aspect of the invention, there is provided a method of removing carbon dioxide and other acid gas components from natural gas which comprises: bringing the natural gas into contact with a liquid including a solvent or reagent for the carbon dioxide and other acid gases; subjecting the natural gas and liquid to turbulent mixing conditions thereby causing the carbon dioxide and other acid gases to be absorbed by the solvent or reagent; and separating a gas phase and a liquid phase.

The invention also extends to the apparatus for carrying out this method.

The turbulent mixing is very intense and results in extremely efficient gas liquid contact. The mixing regime is preferably turbulent shear layer mixing. The liquid entrained in the gas may be in the form of droplets for gas continuous fluid phase distribution. is The efficient mixing means that absorption can take place very rapidly and in a relatively small amount of solvent compared to that required in conventional absorption columns. This in turn means that the liquid duty in the equipment is dramatically reduced resulting in a consequential reduction in the size of any downstream regeneration section. At the same time, the mixing system used is simple and inexpensive compared to prior art systems, leading to reduced costs. Finally, an efficiency of approaching 100% for the removal of acid gas can be achieved for certain applications.

In addition, conventional absorbtion methods involve the evolution of heat which must then be removed from the system. While the method of the invention is capable of operation with a relatively low pressure drop across the mixing means, when greater pressure drop is employed, a cooling effect is achieved and this may render the need for additional cooling unnecessary.

The absorption may be achieved by simply dissolving the gas or by way of a chemical reaction with the solvent.

Preferably, the method is carried out as a continuous process with the natural gas and liquid flowing co-currently. The co-current flow eliminates the problems associated with foaming, since separation can easily be effected downstream of the contactor. Preferably, the method includes the step of treating the liquid phase to remove the absorbed acid gas components.

The turbulent mixing may be achieved by any convenient means, such as an ejector or a jet pump or more preferably in a turbulent contactor including a gas inlet, a liquid inlet, an outlet leading to a venturi passage and a tube extending from the outlet back upstream, the tube being perforated and/or being spaced from the periphery of the outlet.

One suitable contactor is a mixer supplied by Framo Engineering A/S and is described in EP-B-379319.

Preferably, the tube is located in a vessel, the vessel including the gas inlet, the liquid inlet and the outlet. In one possible regime, the natural gas is supplied to the tube, optionally directly, and, the liquid is supplied to the vessel, and so the natural gas stream draws the liquid into the venturi and the two phases are mixed. In another regime, the natural as is supplied to the vessel and the liquid is supplied to the tube, optionally directly, whereby the natural gas is drawn into the venturi by the liquid and the two phases are mixed. In a third regime, the liquid and the natural gas are supplied to the vessel, the liquid being supplied to a level above the level of the outlet, whereby the natural gas is forced out through the outlet via the tube, thereby drawing the liquid into the venturi so that the two phases are mixed.

Preferably, a solvent absorbs the carbon dioxide and other acid gases. Alternatively, a reagent reacts chemically with the carbon dioxide and other acid gases. Conceivably, the reagent is a biological reagent which removes the carbon dioxide and other acid gases biologically. In one variant of the invention, a plurality of acid gas components are absorbed by a plurality of respective solvents or reagents.

Preferably, the natural gas and the liquid are formed into a homogeneous mixture in the contactor, the homogeneous mixtures being cooled prior to separation into a gas phase and a liquid phase. Preferably, the cooled homogeneous mixture is separated into a gas phase and a liquid phase in a hydrocyclone. Preferably, the solvent in the liquid phase is subjected to a regeneration treatment to remove the absorbed acid gases. Preferably, the regenerated solvent-containing liquid phase is recycled to the contactor. Preferably, the regeneration is carried out by heating and/or by flashing off the absorbed gas component in a flash tank. Preferably, the post-mixing cooling and the regenerative heating are achieved, at least in part by mutual heat exchange.

In one alternative arrangement, a portion of the solvent, after extraction, is recycled to the contactor directly, without regeneration. Thus, part of the $CO_2$-loaded solvent by-passes the regeneration section. This serves to increase the $CO_2$ loading of the solvent. It should be noted that optimisation of the process may not necessarily relate to the removal efficiency in terms of mole fraction of $CO_2$ removed, but rather the energy consumption required per unit mass of $CO_2$ removed. By increasing the $CO_s$ loading of the solvent, it is possible to reduce the amount of solvent that needs to be handled by the regeneration section.

In the case of $CO_2$, as the initial solvent loading level is increased, the $CO_2$ absorption efficiency drops. However, a considerable fraction of total liquid flow rate can be recirculated directly from the gas liquid separated before the drop in $CO_2$ removal becomes significant.

According to a more specific aspect of the invention, there is provided a method for removing acid gases from a natural gas which comprises: supplying the natural gas to a turbulent contactor; supplying a liquid including a solvent for the acid gases to the contactor; subjecting the natural gas and the liquid to turbulent mixing in the contactor to form a homogeneous mixture; allowing the acid gas to be absorbed by the solvent; cooling the homogeneous mixture; separating the cooled homogeneous mixture into a gas phase and a liquid phase in a hydrocyclone (or any other gas/liquid separator); removing the gas phase; subjecting the solvent in the liquid phase to a regeneration treatment to remove the absorbed acid gas; and recycling the regenerated solvent-containing liquid phase to the contactor.

Again, a portion of the solvent, after extraction may be recycled directed to the contactor.

Preferably, the regeneration is carried out by heating and/or by flashing off the absorbed gas component in a flash tank. Preferably, the post mixing cooling and the regenerative heating are achieved, at least in part by mutual heat exchange. Preferably, in instances where the natural gas is at a low pressure, the liquid is pumped to the contactor and thereby draws the natural gas with it through the contactor. Preferably, when the natural gas is at high pressures, it is conveyed to the contactor at a high pressure and thereby draws the liquid with it through the contactor.

The invention also extends to apparatus for carrying out such a method, comprising: a turbulent contactor having a liquid inlet, a gas inlet and a fluid outlet; a cooler for the fluid stream from the fluid outlet; a hydrocyclone arranged to separate the cooled fluid stream into a gas phase and a liquid stream; a regenerator arranged to treat the separated liquid stream; and a recycle line arranged to convey the regenerated liquid stream to the contactor.

The apparatus may include a recycle line for the liquid stream from the separator to the contactor, by-passing the regenerator. There may also be a further separator, for example, in the form of a flash tank, in lo the recycle line to allow absorbed gas to be released from the liquid.

The apparatus may include a pump arranged to supply liquid to the liquid inlet of the contactor. Preferably, the regenerator is a heater and/or a flash is tank. Preferably, the contactor is a turbulent contactor as described above, or alternatively an ejector or a jet pump.

The invention may be considered to extend to the use of a turbulent contactor to remove acid gas from natural gas by forming a homogeneous mixture of the gas mixture with a solvent for the acid gas in the contactor, allowing the acid gas to be absorbed by the solvent, and subsequently separating a gas phase and a liquid phase, the liquid phase thereby containing the acid gas.

The improved efficiency possible for the removal of acid gases makes the present invention particularly valuable as awareness is increased of the potential damage to the environment that can be caused by acid gases.

Furthermore, the small size of the apparatus compared to conventional absorption columns render the invention especially applicable to use in marine applications, such as on board shuttle tankers.

The invention may be put into practice in various ways and two specific embodiments will be described by way of example to illustrate the invention with reference to the accompanying drawings, in which:

DETAILED DESCRIPTION OF THE INVENTION

Figure 1:
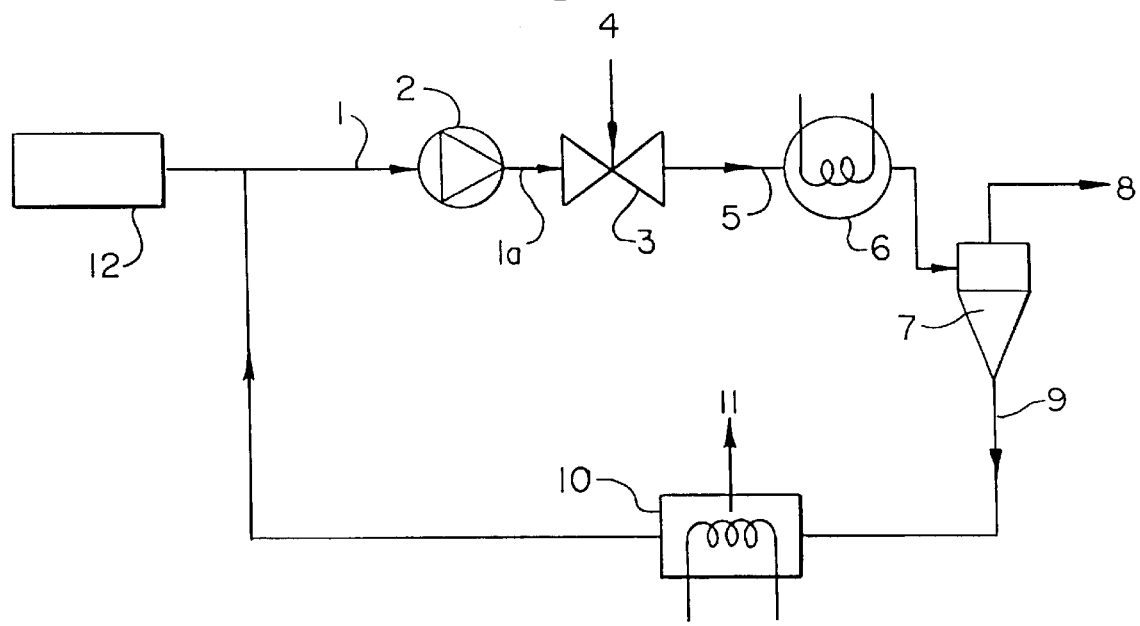
FIG. 1 is a flow diagram of the process for use when the gas is under low pressure.

In one embodiment of the invention, a continuous process operation for the removal of carbon dioxide (and other acid gases) from exhaust gas is shown in FIG. 1. A liquid solvent stream 1, for example MEA (monoethanolamine), is conducted by a pump 2 to a contactor 3 (though this could be an ejector) capable of inducing turbulent mixing. A natural gas stream 4, including the $CO_2$ which is to be removed, is drawn into the contactor 3 by the low pressure generated in the venturi by the liquid stream after it has passed through the pump (stream 1$a$). This arrangement provides an automatic means of self-regulation as the gas mixture to solvent ratio can be maintained for varying flow rates. At the outlet of the contactor 3 the liquid solvent and the natural gas stream are in the form of a homogeneous mixture (stream 5) and the mass transfer of the $CO_2$ from the gas phase to the liquid occurs very rapidly.

The mixed two phase stream 5 is then conveyed to a cooler 6 and on into a hydro cyclone 7. The gas stream 8 is taken off and the liquid stream 9 passes on to a regeneration system. At this point in the circuit all the $CO_2$ is in the liquid phase (stream 9) and the gas stream 8 is free of $CO_2$.

The regeneration of the liquid solvent is achieved by boiling off the $CO_2$ in a heater 10. The $CO_2$ is taken off as a gas stream 11 and the liquid solvent is optionally passed through a flash tank (not shown) to remove any residual dissolved gas before being recycled into the feed stream 1. The liquid solvent in stream 1 is topped up from the reservoir 12 as necessary to maintain a regular flow rate around the system.

It will be clear to a person skilled in the art that the cooler 6 and the heater 10 may be combined to form a heat exchange unit.

Figure 2:
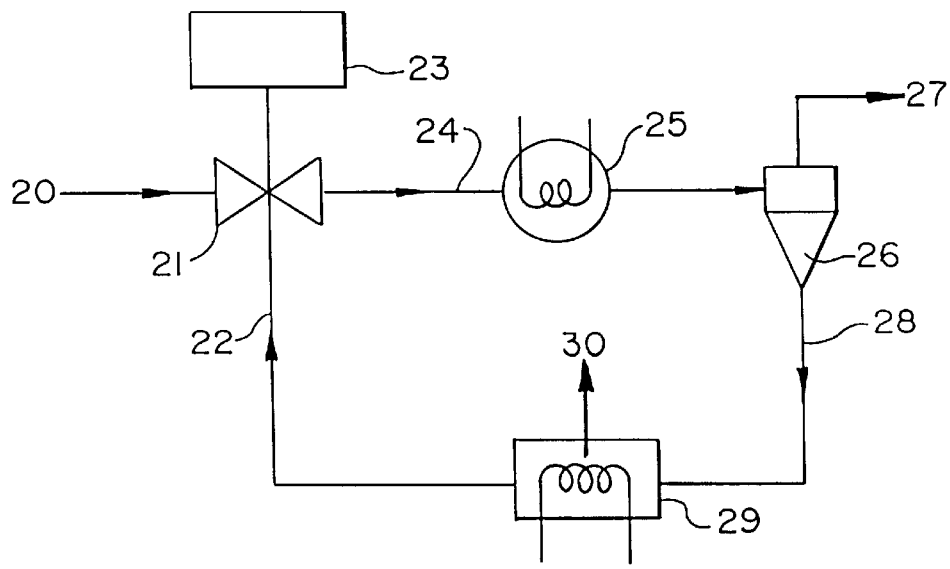
FIG. 2 is a flow diagram of the process for use when the gas is under high pressure.

An alternative system for the removal of $CO_2$ from a high pressure natural gas stream is shown in FIG. 2. A high pressure natural gas stream 20 containing the $CO_2$ which is to be removed is conveyed to a contactor 21 similar to that shown in FIG. 4. The high pressure of the gas draws a controlled amount of liquid solvent, for example MEA, from the recycle stream 22 and, if necessary, from a reservoir 23 into the contactor 21.

At the outlet of the contactor 21 the two phases are in the form of a homogeneous mixture (stream 24) and the mass transfer of the $CO_2$ from the gas phase to the liquid solvent takes place. The residence time may be as little as 0.1 seconds since the reaction kinetics for the absorption of $CO_2$ by MEA are very rapid, although this will vary with the solvent used and the gas to be transferred from the gas to the liquid.

The two phase mixture (stream 24) passes through a cooler 25 to a hydro cyclone unit 26. The gas stream free of $CO_2$ is taken off in stream 27 and the remaining liquid stream 28 including the $CO_2$ is passed to a regeneration system.

The liquid stream 28 is fed into a heater 29 to remove the $CO_2$ as a gas stream 30. This regenerates the solvent for re-use in the system. This solvent (stream 22) is then drawn into the contactor 21 by the low pressure generated in the venturi by the high pressure natural gas (stream 20) as explained above. Any shortfall in the solvent liquid is made up by addition from the reservoir 23. As in the first embodiment, the heater 29 and the cooler 25 can be combined to form a heat exchange unit.

Figure 4:
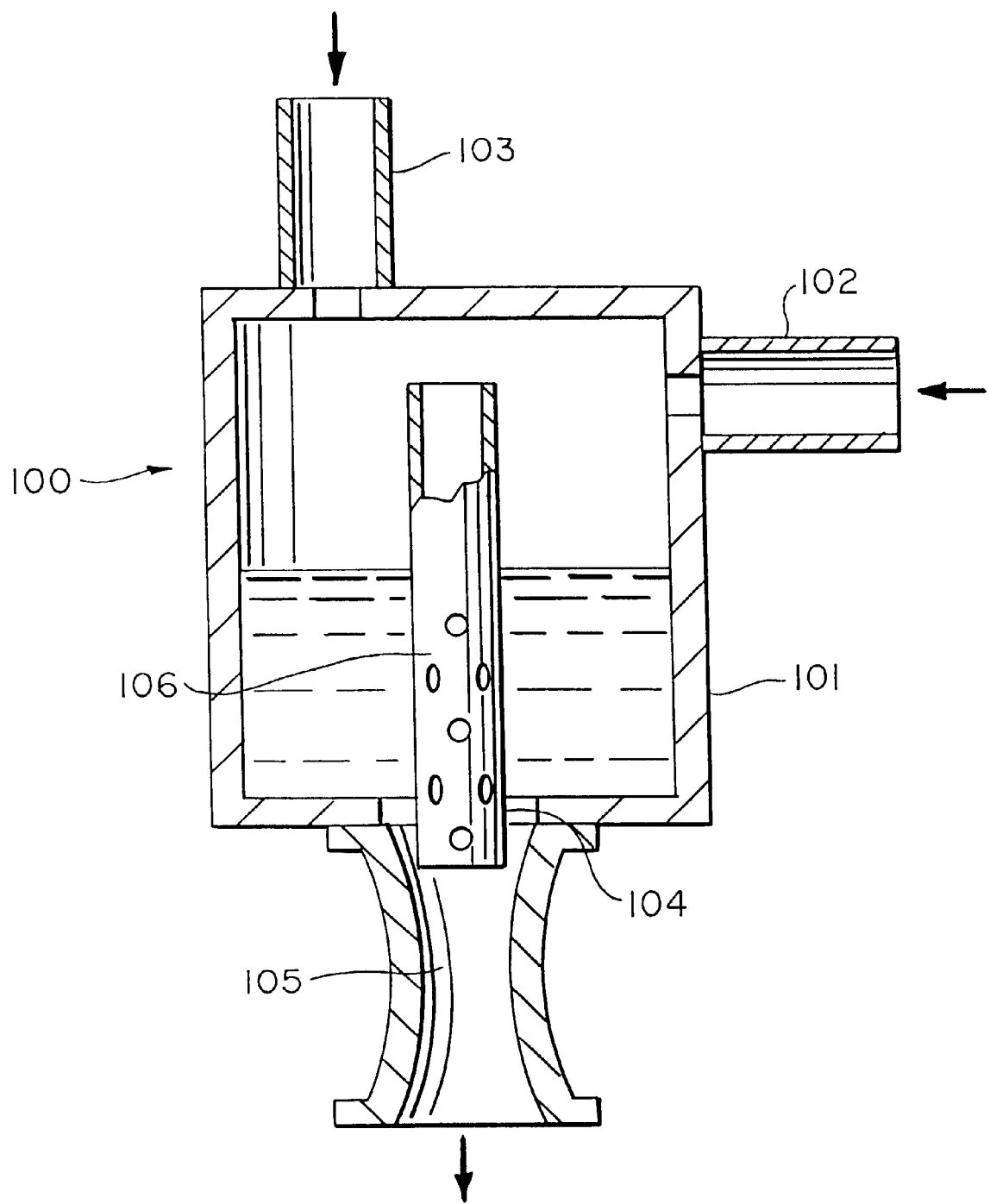
FIG. 4 is a view of the turbulent contactor as used in the batch test procedure.

The contactor used in both the above embodiments is shown in FIG. 4. The turbulent contactor 100 comprises a vessel 101 having a gas inlet 102, a liquid inlet 103 is and an outlet 104 leading to a venturi passage 105. There is a tube 106 (which may or may not be perforated) extending from the outlet 104 back into the vessel 101.

In a first arrangement, the natural gas is supplied to the vessel 101 and the liquid solvent is supplied to the tube 106 whereby the gas is drawn into the venturi by the liquid and the two phases are mixed.

In a second arrangement, the liquid solvent is supplied to the vessel 101 and the gas mixture is supplied to the tube 106, whereby the liquid is drawn into the venturi by the gas and the two phases are mixed.

In a third arrangement, the liquid solvent and the natural gas are supplied to the vessel 101, the solvent being supplied to a level above the level of the outlet 104, whereby the gas is forced out through the outlet 104 via the tube 106, thereby drawing the solvent into the venturi so that the two phases are mixed.

Figure 5:
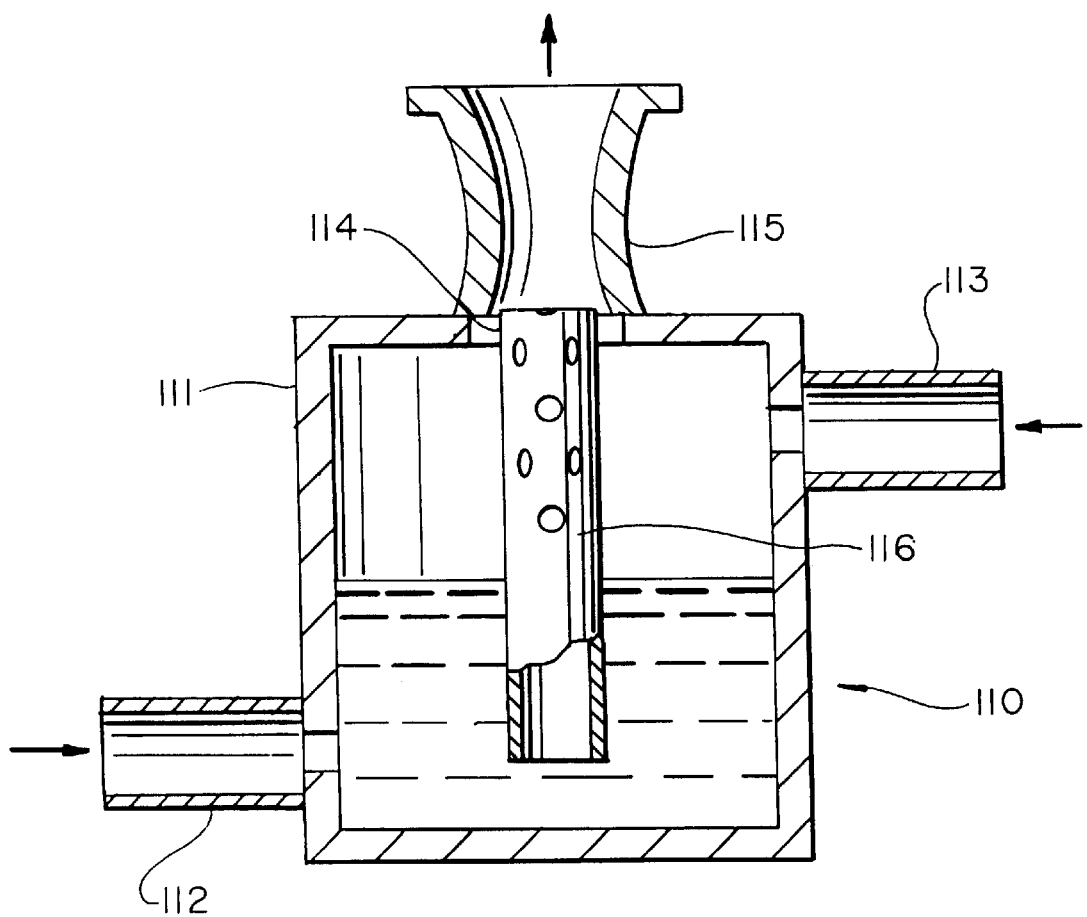
FIG. 5 shows an alternative mixer arrangement.

A fourth variant is shown in FIG. 5. This embodiment is similar to that shown in FIG. 4, but the contactor 110 is inverted. It comprises a vessel 111 with a liquid inlet 112, a gas inlet 113 and an outlet 114 leading to a venturi passage 115. There is a tube 116 (which may or may not be perforated) extending from the outlet 114 back into the vessel 111. The tube 116 may be connected directly to the gas inlet 113.

Figure 6:
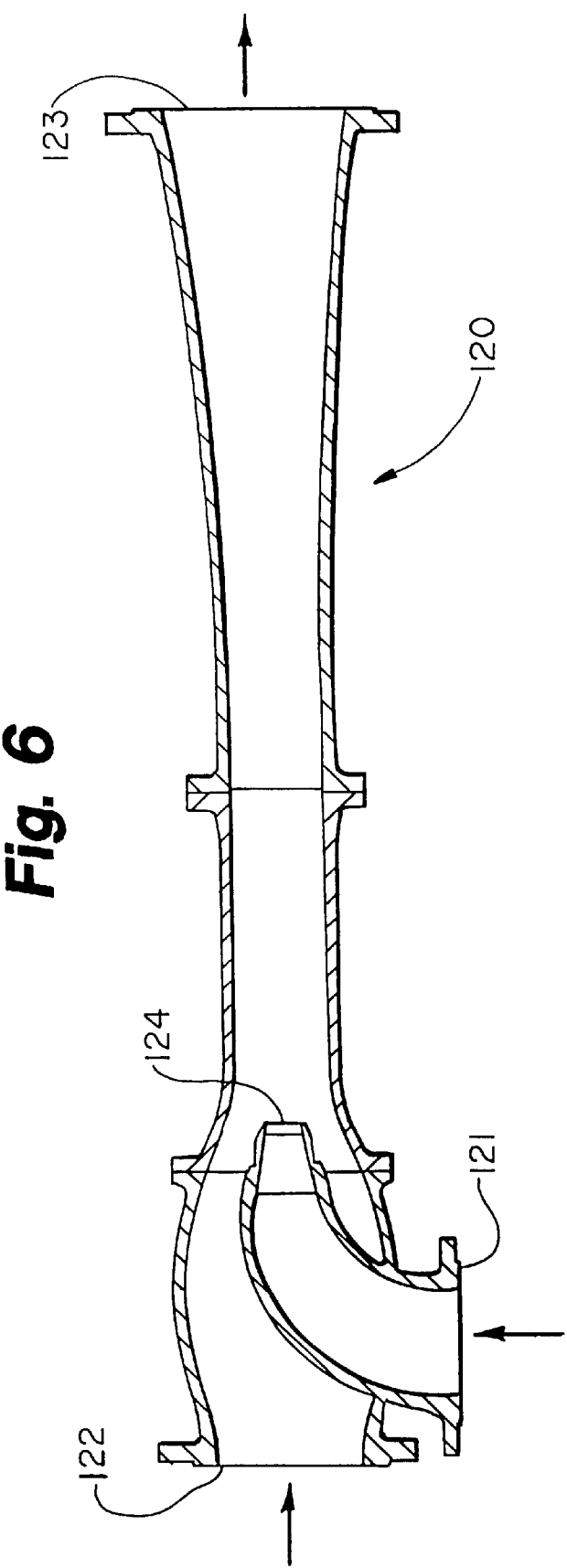
FIG. 6 is a view of a jet pump which can be used as an alternative to the contactor.

The contactors referred to in the above embodiments may be replaced by jet pump arrangements which are capable of inducing turbulent mixing. FIG. 6 shows a jet pump 120 comprising a first fluid inlet 121 for the high pressure fluid and a second fluid inlet 122 for the low pressure fluid. The high pressure fluid draws the low pressure fluid along the length of the jet pump 120 to the outlet 123. The fluids are well mixed into a homogenised mixture in the region 124 at the outlet of the high pressure inlet 121.

Figure 7:
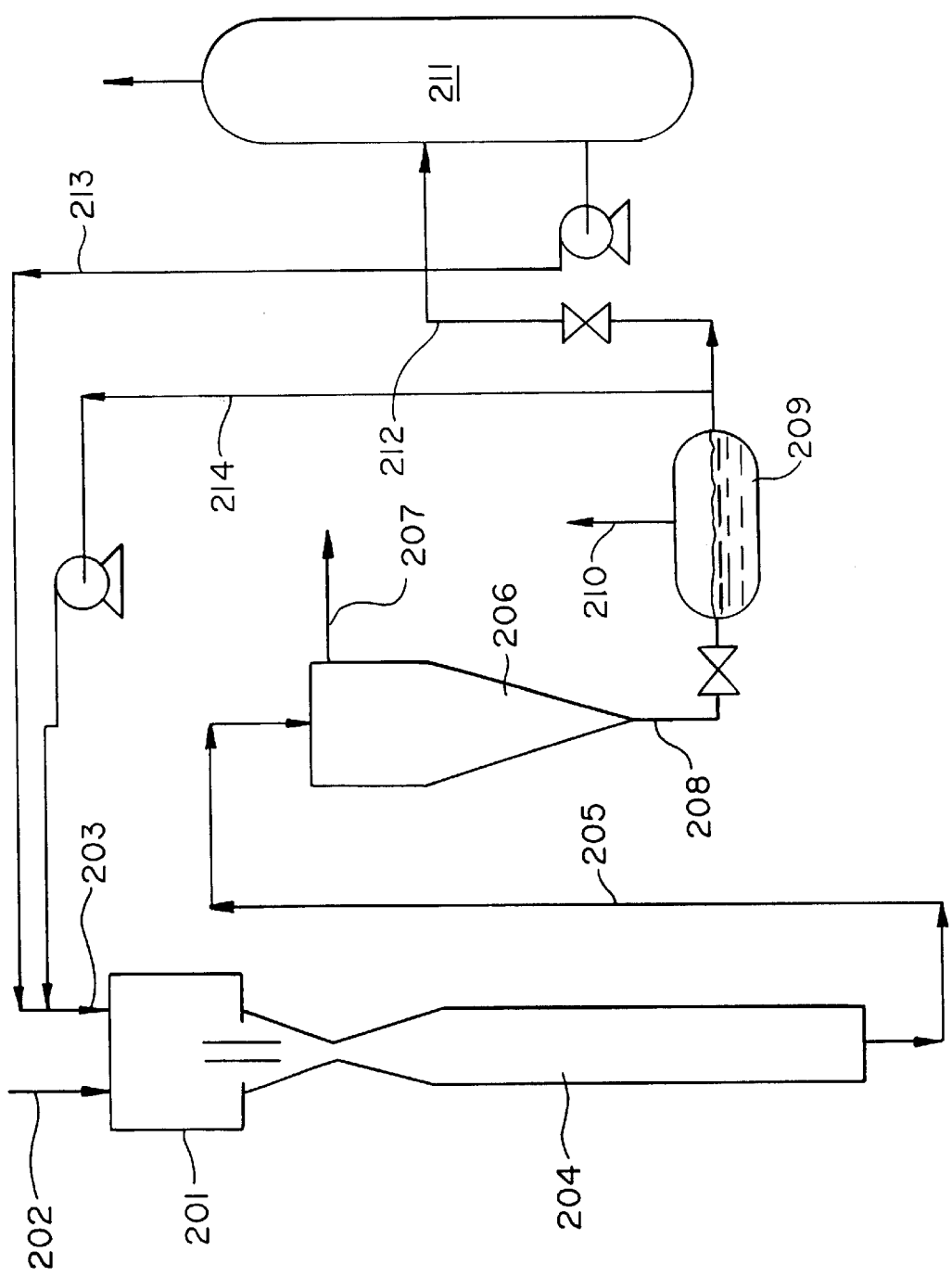
FIG. 7 is a block diagram of an alternative embodiment of a process according to the invention.

An alternative embodiment is shown in FIG. 7. Here the $Co_2$-containing gas is supplied to the contactor 201 via a gas inlet 202 and solvent is supplied via a solvent inlet 203. The two phases are mixed in the contactor 201 and subsequently in a contact pipe 204. The homogeneous mixture is fed via a line 205 to a separator 206 where separation into a cleaned gas stream 207 and a $CO_2$ loaded solvent stream 208 is effected.

The loaded solvent is conveyed to a flash tank 209 where some of the absorbed $CO_2$ comes out of solution and is removed via line 210. The partially loaded solvent is conveyed to a desorption column 211 via line 212 where the solvent is regenerated and returned to the contactor 201 via line 213.

However, a portion of the partially-loaded solvent is recycled, without regeneration, via recycle line 214, directly to the contactor 201. This serves to increase the loading of the solvent in the system and thus enables the duty of the regeneration operation to be reduced.

The invention is further illustrated by reference to the following examples. These serve to verify the operating principles of the two embodiments described. In the series of batch experiments conducted, the gas stream was a mixture of nitrogen ($N_2$) and $CO_2$ and the liquid solvent was a mixture of MEA and water. The reservoir pipe was kept under pressure using nitrogen gas. The contactor used was a FRAMO contactor generally as described in EP 379319 and shown in FIG. 4. The mixer injection pipe was adjusted to yield gas/liquid ratios in the range of about 3 to 5, depending upon the total flow rate.

Figure 3:
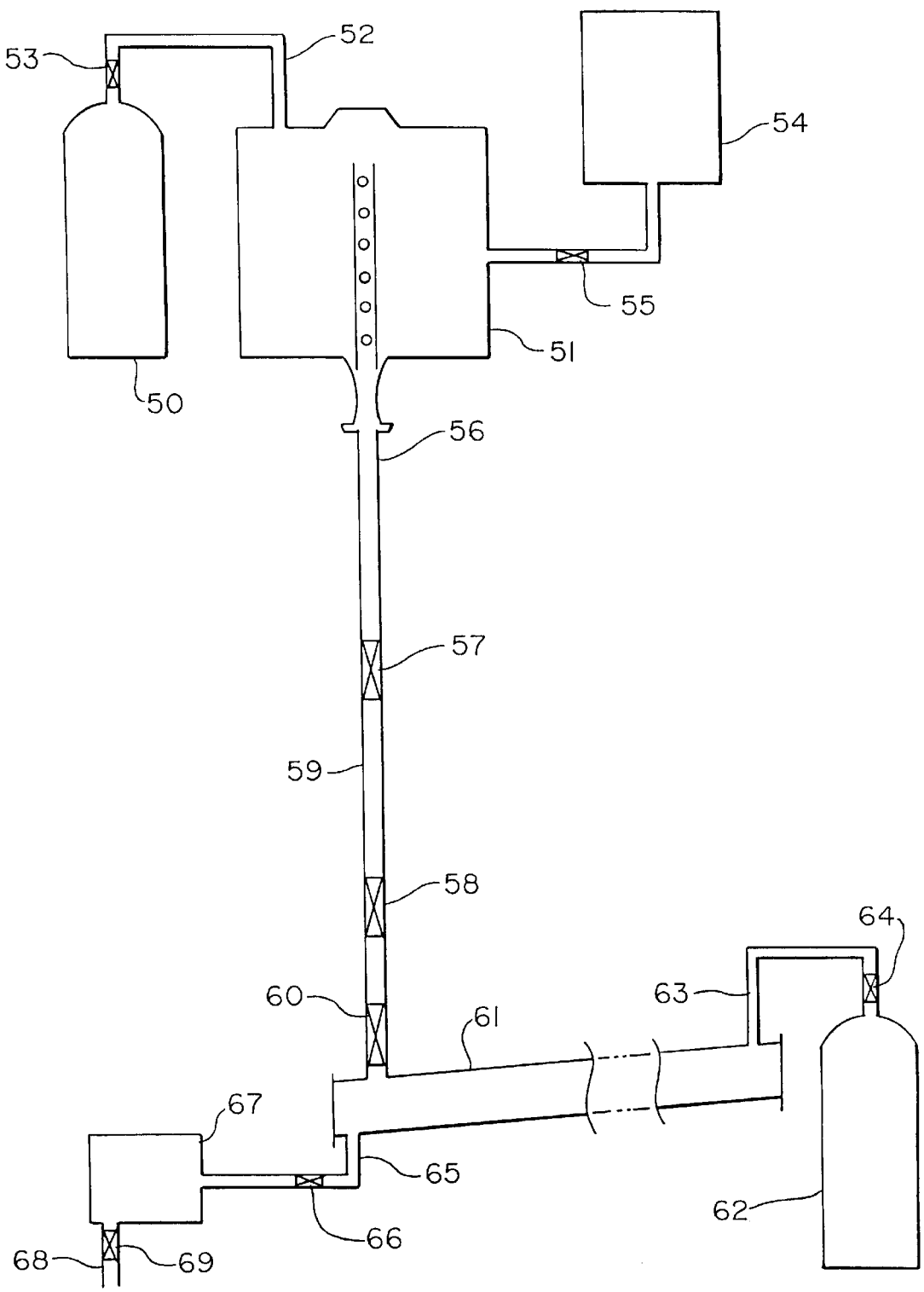
FIG. 3 is a block diagram of the apparatus as used in the batch test procedure.

A schematic diagram for the series of experiments is shown in FIG. 3. The contactor 51 is charged with an amount of the liquid solvent mixture from the reservoir 54 which is controlled by a valve 55. A gas source 50 of the experimental $N_2$/$CO_2$ gas mixture is conveyed to the contactor 51 via a pipe 52 controlled by a valve 53.

At the outlet of the contactor 51 there is a 1 metre section of pipe 56 in which the mass transfer occurs. This section provides the residence time for the contacting materials. A set of 2 simultaneously acting fast closing valves 57 and 58 form a 1.5 metre analysis section 59 where the gas/liquid mixture can be captured, separated and sampled. At the top end of the analysis section there is a sampling point where a sample of the gas can be drawn off (not shown). At the lower end of the section there is a further sampling point where a sample of the liquid can be drawn off (not shown). The lower section of the sampling section is provided with means for cooling the liquid sample prior to its removal (not shown for clarity).

A further valve 60 separates the sampling section from a reservoir pipe 61 and is used to control the flow rate through the system. The reservoir pipe 61 is pressurised to a predetermined pressure by an independent nitrogen gas source 62 via a pipe 63 controlled by a valve 64. This pressure will be lower than that in the contactor to provide a pressure difference which will force the fluids through the system. The reservoir pipe 61 is inclined with respect to the horizontal to enable the liquid collected to be drained off via a pipe 65 controlled by a valve 66 to a measurement drum 67 which is used to determine the amount of liquid passing through the system on each run. The drum 67 has a drainage pipe 68 controlled by a valve 69.

In operation, the contactor 51, pipe section 56 and analysis section 59 are filled with the suitable strength solvent solution. The simultaneously acting valves 57 and 58 are closed and valve 60 is set to a position carefully adjusted to yield the required mass flow rate through the system for the predetermined pressure difference between the contactor and the reservoir pipe.

The contactor 51 is pressurised with the test gas of $CO_2$-rich nitrogen to a pressure of 50 barg. The reservoir pipe 61 is pressurised with nitrogen to a predetermined value typically between 16 and 48 barg, providing a range of flow rates through the system.

Before the experiment starts, a sample of the test gas is taken to determine the level of $CO_2$ in the gas.

The experiment commences with the activation of the simultaneously operating valves 57 and 58. The liquid and the gaseous solution flow co-currently through the system to the reservoir pipe 61. The pressure in the contactor is maintained at 50 barg during the 10 second test run by manual supply of the test gas from a cylinder fitted with an accurate manometer. This makes it possible to record the amount of spent gas for each experiment.

After 10 seconds the 2 operating valves 57 and 58 are closed simultaneously. A sample of gas from the analysis section is extracted from the upper sampling point immediately after the valves have closed. This is then tested for content of $CO_2$ by gas chromatography. The machine used was a Chromopack Model CP-2002 gas chromatograph.

In order to verify the mass balance, a liquid sample of the amine solution in the analysis section is taken from the lower sampling point. Before the sample is taken the liquid in the analysis section is cooled using nitrogen gas surrounding the pipe section 59. The liquid sample is analyzed using a titration technique specially developed for $CO_2$.

At the end of each run, the liquid from the reservoir pipe 61 is released into the measurement drum 67 to measure the amount of liquid expended in the course of the run.

The results of the tests are shown in Table 1 below:

TABLE 1

| MEA wt % | mol % $CO_2$ in exit gas | gas flow rate (m³/hr) | liquid flow rate (m³/hr) | total flow rate (m³/hr) | gas volume fraction |
|---|---|---|---|---|---|
| 50 | 0.005 | 10.34 | 4.63 | 14.97 | 0.69 |
| 50 | 0.003 | 11.76 | 3.92 | 15.68 | 0.75 |
| 50 | 0.005 | 12.12 | 3.92 | 16.04 | 0.76 |
| 50 | 0.002 | 10.87 | 3.92 | 14.79 | 0.73 |
| 50 | 0.006 | 10.08 | 3.96 | 14.04 | 0.72 |
| 50 | 0.007 | 11.7 | 3.6 | 15.3 | 0.76 |
| 50 | 0.019 | 10.44 | 3.24 | 13.68 | 0.76 |
| 50 | 0.006 | 7.2 | 3.24 | 10.44 | 0.69 |
| 50 | 0.007 | 15.48 | 3.24 | 18.72 | 0.83 |
| 25 | 0.009 | 10.08 | 4.68 | 14.76 | 0.68 |
| 25 | 0.005 | 9 | 3.96 | 12.96 | 0.69 |
| 25 | 0.006 | 9 | 3.96 | 12.96 | 0.69 |
| 25 | 0.003 | 6.84 | 3.6 | 10.44 | 0.66 |
| 25 | 0.005 | 14.04 | 4.32 | 18.36 | 0.76 |
| 5 | 2.03 | 14.4 | 3.6 | 18 | 0.80 |
| 5 | 0.5 | 15.12 | 3.24 | 18.36 | 0.82 |
| 5 | 2.95 | 17.28 | 3.24 | 20.52 | 0.84 |
| 5 | 3.65 | 18.72 | 1.8 | 20.56 | 0.91 |
| 5 | 1.63 | 12.6 | 3.96 | 16.56 | 0.76 |
| 5 | 2 | 14.76 | 3.96 | 18.72 | 0.79 |
| 5 | 2.13 | 15.84 | 3.6 | 19.44 | 0.81 |
| 5 | 0.31 | 7.92 | 3.6 | 11.52 | 0.69 |
| 5 | 1.25 | 7.92 | 3.6 | 11.52 | 0.69 |
| 5 | 2.32 | 10.44 | 3.6 | 14.04 | 0.74 |
| 5 | 2.67 | 11.16 | 3.6 | 14.76 | 0.76 |
| 5 | 3.4 | 18 | 3.6 | 21.6 | 0.83 |

In all cases the gas feed composition was 10.5 mol per cent $CO_2$ in nitrogen.

The results show that virtually all the $CO_2$ is absorbed from the gas to the liquid solvent for the 50% and 25% mixture for all the flow rates tested. Only on reduction of the MEA concentration to a mere 5% by weight does the amount of $CO_2$ remaining in the gas reach appreciable levels.

From the measurements at the 5% level, it can be seen that the absorption efficiency decreases with an increasing gas flow rate and gas volume fraction. This result is expected since the already lean solvent mixture (only 5% MEA) has a diminishing capacity to absorb all of the $CO_2$.

The gas chromatograph measurements of the $CO_2$ were verified using the data obtained from the titration of the liquid sample. A mass balance calculation on the $CO_2$ through the system showed that the $CO_2$ which was in the test gas had been transferred to the liquid.

In a second set of experiments, the contactor 51 was only pressurised to a low pressure (in the range 0.5 to 2 barg) and the reservoir pipe 61 was left open to atmospheric pressure. This gave a driving force of between 0.5 and 2 bar. The only change to the apparatus from the first set of experiments is the addition of a small hydrocyclone at the top of the gas pipe to separate the gas and liquid after reaction. This means that there are no entrained droplets in the gas sample. In these experiments, the liquid solvent mixture is a 50% solution of MEA and the gas feed composition was 9.4 mol per cent $CO_2$ in nitrogen. As for the first set of experiments, the test run lasted for 10 seconds and the pressure in the contactor was maintained by manual supply of the test gas. The results are shown in table 2 below.

TABLE 2

(1) -this experiment had a run time of 20 seconds.

| Mixer P (barg) | mol % $CO_2$ in exit gas | gas flow rate (m³/hr) | liquid flow rate (m³/hr) | total flow rate (m³/hr) | gas volume fraction |
|---|---|---|---|---|---|
| 0.5 | 0.59 | 2.16 | 4.68 | 6.84 | 0.316 |
| 0.5 | 0.87 | 1.80 | 4.32 | 6.12 | 0.294 |
| 0.5 | 0.80 | 2.16 | 3.96 | 6.12 | 0.353 |
| 1 | 0.80 | 3.24 | 4.68 | 7.92 | 0.409 |
| 1 | 0.95 | 3.24 | 4.32 | 7.56 | 0.429 |
| 1 | 1.20 | 3.42 | 4.32 | 7.74 | 0.442 |
| 1.5 | 1.10 | 4.68 | 4.32 | 9.00 | 0.520 |
| 1.5 | 0.76 | 4.68 | 4.14 | 8.82 | 0.531 |
| 1.5 | 1.27 | 5.04 | 4.32 | 9.36 | 0.538 |
| 2 | 0.73 | 6.12 | 5.22 | 11.34 | 0.540 |
| 2 | 1.10 | 6.48 | 5.76 | 12.24 | 0.529 |
| 2 | 0.82 | 6.12 | 5.40 | 11.52 | 0.531 |
| 0.5 | 0.13 | 2.52 | 3.96 | 6.48 | 0.389 |
| 0.5 | 0.61 | 3.60 | 3.96 | 7.56 | 0.476 |
| 0.5(1) | 0.45 | 2.16 | 3.69 | 5.85 | 0.369 |

The small pressure difference driving the fluids through the system results in there being more liquid relative to the gas than in the previous experiments. Even at these lower gas volume fractions, most of the carbon dioxide is removed from the gas phase. It will be noted that there is no real trend from a pressure difference of 0.5 to 2.0 bar so it will be apparent that this method is applicable down to lower pressure differences than 0.5 bar. Such pressure differences may be present, for example, in exhaust gas systems.

What is claimed is:

1. A method of removing acid gas components from a gas mixture comprising the steps of: bringing the gas mixture into contact with a liquid including a solvent or reagent for the acid gas components; subjecting the gas mixture and liquid to turbulent mixing conditions thereby causing the acid gases to be absorbed by the solvent or reagent; and separating a gas phase and a liquid phase in which the mixing is conducted in a turbulent contactor including a gas inlet, a liquid inlet, an outlet leading to a venturi passage and a tube extending from the outlet back upstream, in which the tube is perforated, spaced from the periphery of the outlet or both perforated and spaced from the periphery of the outlet.

2. A method as claimed in claim 1, in which the method is carried out as a continuous process with the gas mixture and the liquid flowing co-currently.

3. A method as claimed in claim 1, further comprising the step of treating the liquid phase to remove the absorbed acid gas components.

4. A method as claimed in claim 1, in which the tube is located in a vessel, the vessel including the gas inlet, the liquid inlet and the outlet.

5. A method as claimed in claim 4, in which the gas mixture is supplied to the tube forming a gas mixture stream and the liquid is supplied to the vessel, and so the gas mixture stream draws the liquid into the venturi and the two phases are mixed.

6. A method as claimed in claim 4, in which the gas mixture is supplied to the vessel and the liquid is supplied to the tube, whereby the gas mixture is drawn into the venturi by the liquid and the two phases are mixed.

7. A method as claimed in claim 4, in which the liquid and the gas mixture are supplied to the vessel, the liquid being supplied to a level above the level of the outlet, whereby the gas mixture is forced out through the outlet via the tube, thereby drawing the liquid into the venturi so that the two phases are mixed.

8. A method as claimed in any of claims 1, in which the gas mixture and the liquid are formed into a homogeneous mixture in the contactor, the homogeneous mixture being cooled prior to separation into a gas phase and a liquid phase.

9. A method as claimed in claim 8, in which the cooled homogeneous mixture is separated into a gas phase and a liquid phase in a hydrocyclone.

10. A method as claimed in claim 9, in which the solvent in the liquid phase is subjected to a regeneration treatment to remove the absorbed acid gases.

11. A method as claimed in claim 10, in which the regenerated solvent-containing liquid phase is recycled to the contactor.

12. A method as claimed in claim 11, in which the regeneration is carried out by heating, flashing off the absorbed gas component in a flash tank or both heating and flashing off the absorbed gas component in a flash tank.

13. A method as claimed in claim 12, in which the post-mixing cooling and the regenerative heating are achieved at least in part by mutual heat exchange.

14. A method as claimed in claim 10, in which a portion of the liquid phase is recycled to the contactor without being subjected to a regeneration treatment, thereby by-passing a regeneration section.

15. A method as claimed in claim 1 in which the acid gas is $CO_2$, $H_2S$, $No_x$ or a sulphur oxide.

16. A method as claimed in claim 1, in which the solvent or reagent is methyldiethanolamine (MDEA, monoethanolamine (MEA) or diethanolamine (DEA).

* * * * *